May 7, 1940.  H. KUPPENBENDER ET AL  2,199,464
PHOTOGRAPHIC CAMERA
Filed Oct. 11, 1938   6 Sheets-Sheet 1
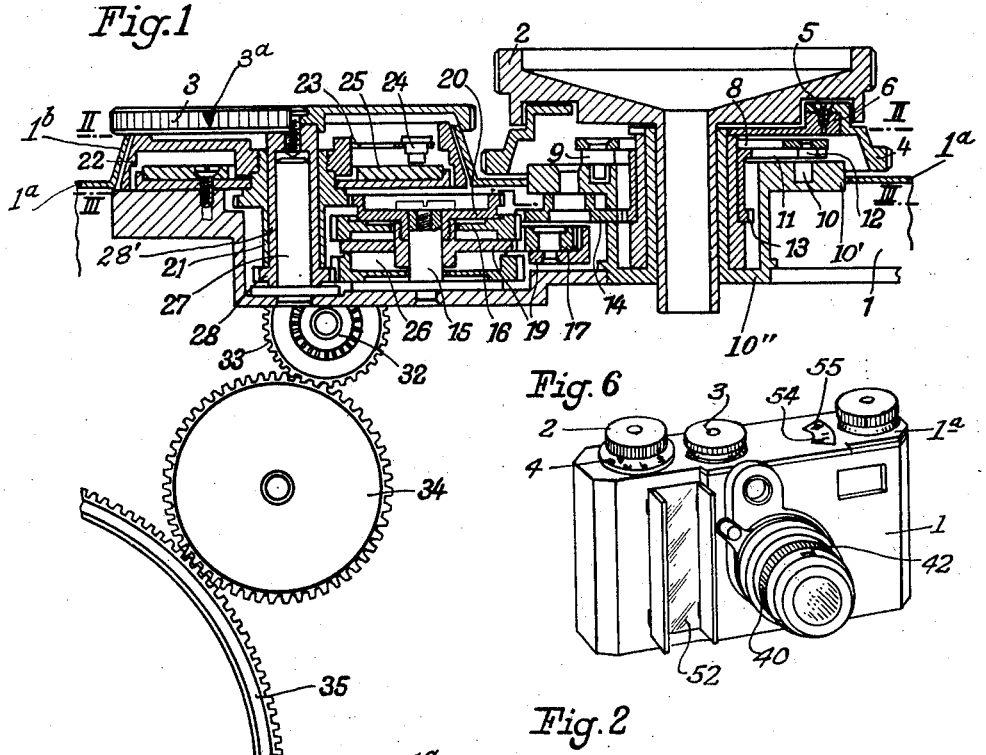
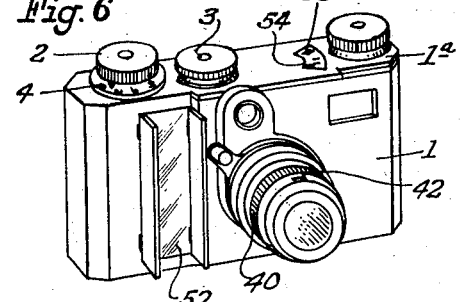
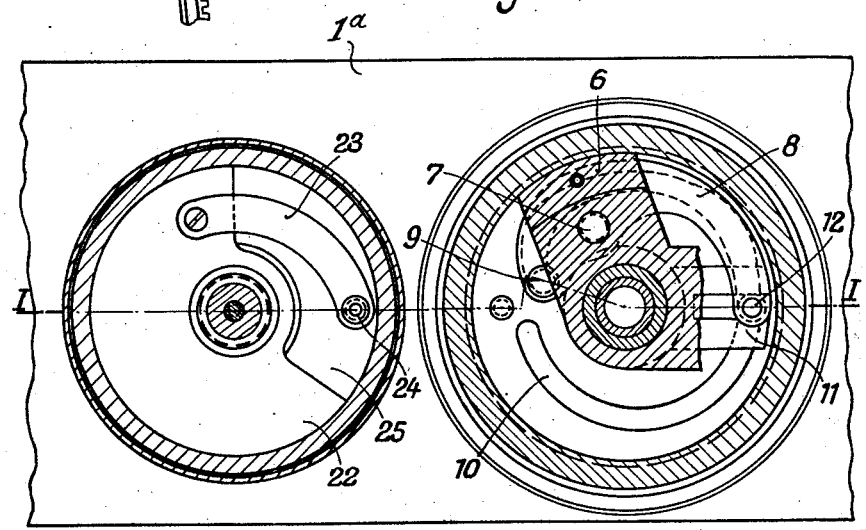
INVENTORS:
HEINZ KUPPENBENDER
OSKAR FISCHER
GERHARD HENKEL
OTTOMAR PETERS
ARTHUR MENDE
by B. Singer & F. Stern
Attorneys May 7, 1940.	H. KUPPENBENDER ET AL	2,199,464
PHOTOGRAPHIC CAMERA
Filed Oct. 11, 1938	6 Sheets-Sheet 2

INVENTORS:
HEINZ KUPPENBENDER
OSKAR FISCHER
GERHARD HENKEL
OTTOMAR PETERS
ARTHUR MENDE
by B. Singer & F. Stern
Attorneys

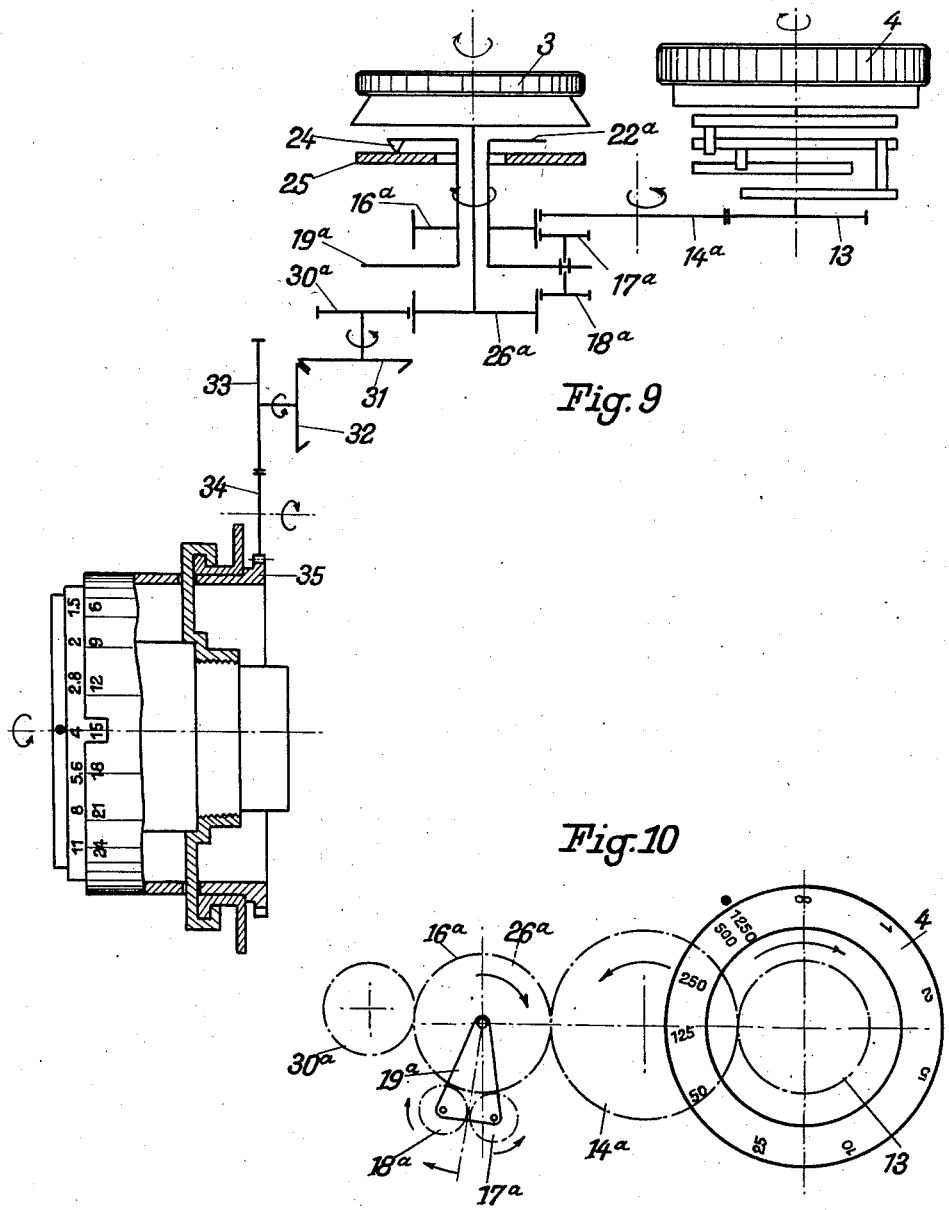

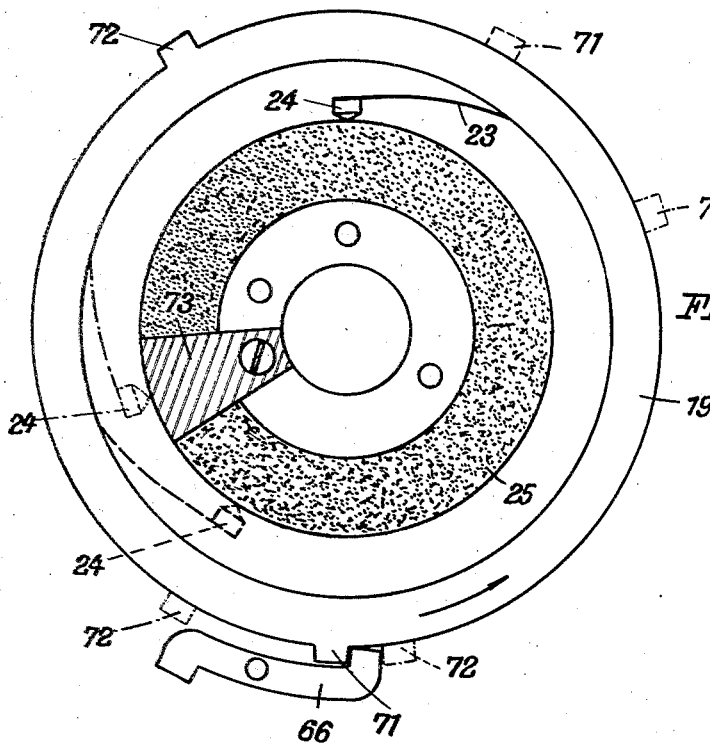
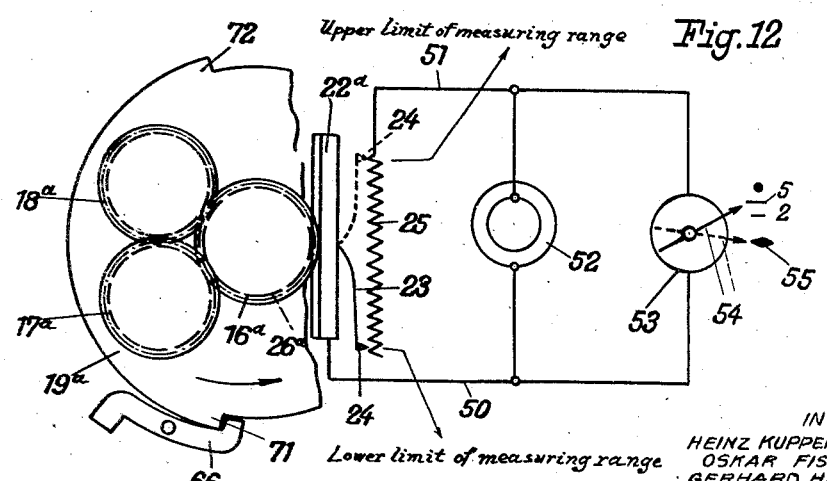

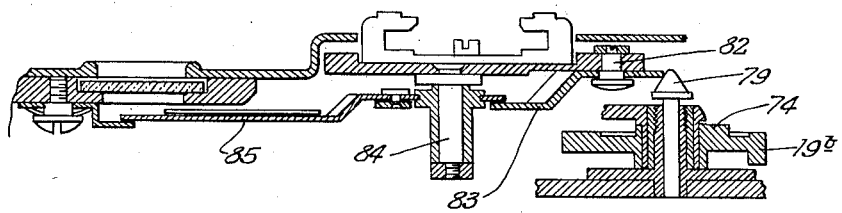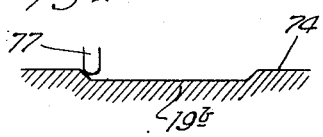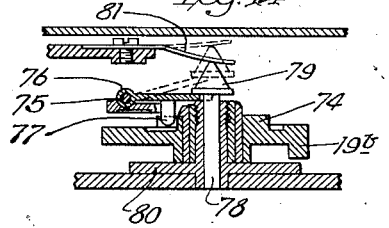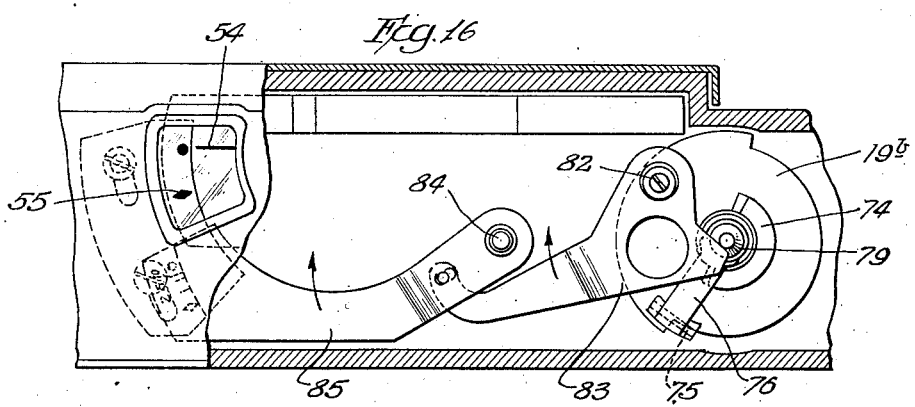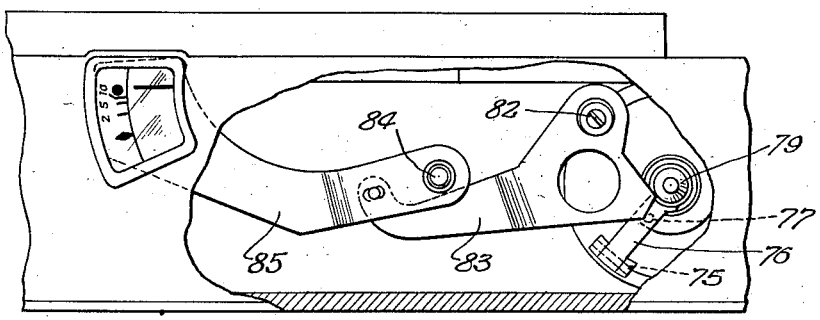

Patented May 7, 1940

2,199,464

UNITED STATES PATENT OFFICE 2,199,464

PHOTOGRAPHIC CAMERA

Heinz Küppenbender, Oskar Fischer and Gerhard Henkel, Dresden, and Ottomar Peters, Hansdorf, and Arthur Mende, Dresden, Germany, assignors to Zeiss Ikon Aktiengesellschaft, Dresden, Germany Application October 11, 1938, Serial No. 234,350
In Germany October 14, 1937

13 Claims. (Cl. 95—10)

The invention relates to improvements in photographic cameras and in particular is directed to photographic cameras whose exposure controlling means are operatively coupled with a photo-electric exposure meter.

It has been proposed heretofore to provide in the circuit of the photo-electric exposure meter a variable resistance which is automatically varied whenever any one of the exposure controlling devices of the camera, as for instance the shutter speed adjusting means or the diaphragm adjusting means, is adjusted. It was customary to mount the resistance rotatably adjustably and control its rotative movement by one of the exposure controlling devices of the camera, e. g., by the diaphragm adjusting mechanism, and to provide the resistance with a slidable contact member operatively connected with another exposure controlling means and moved simultaneously with the latter, e. g., with the shutter speed adjusting mechanism. The above named movable arrangements of the resistance and contact member, however, are not practical, especially when the characteristic of the resistance is not linear and the angular adjustments for the same ohmic value are not equal to each other, but are different.

A rotatable resistance requires a somewhat complicated adjusting mechanism and at least two movable circuit connections are necessary which in view of the small currents in the circuit give rise to difficulties.

It is one object of the invention to eliminate the disadvantages of the prior devices and to provide a photographic camera of the type referred to with a photo-electric exposure meter having a fixedly mounted resistance which is varied by single slidable contact member whose movements are controlled by both of the principal exposure controlling devices of the camera, as the diaphragm adjusting mechanism and the shutter speed adjusting mechanism.

Another object of the invention is to operatively connect the slidable contact member of the resistance in the exposure meter circuit with both said principal exposure controlling devices of the camera by means of a differential gearing, which preferably is self-locking.

Still another object of the invention is to incorporate in one of the branches of the differential gearing, preferably in that portion of the gearing between the shutter speed adjusting member and the slidable contact member, a cam drive for compensating the differences between the light values and the corresponding values of the resistance units.

It is also an object of the invention to provide the camera with means for adjusting the exposure controlling devices with respect to various film speeds. Preferably, a rotatable adjusting ring, having a window in which numbers indicating film speeds become visible, is arranged in the operative connection between a diaphragm adjusting knob and the guide ring for the shutter blades of the diaphragm. The adjusting ring is coupled to the above mentioned guide ring by means of a manually releasable latch and upon a release of the latch may be rotatably adjusted with respect to the latter until the desired film speed number appears in its window.

Another object of the invention is to provide two rotatable knobs on the narrow top wall of the camera, one adjacent the other. One of said knobs is used for adjusting the speed of the shutter and the other for adjusting the diaphragm aperture of the photographic objective and both knobs are operatively connected with the slidable contact member of the resistance in the photo cell circuit.

It is also an object of the invention to provide releasable locking means for normally limiting the movement of the slidable contact member of the resistance of the exposure meter in both directions to prevent at one end of the resistance a short-circuiting of the measuring instrument and to provide at the other end of the resistance a signal notifying the user of the camera that the entire resistance has been inserted in the circuit of the exposure meter. Upon release of the locking means one or both of the exposure controlling devices may be further adjusted in accordance with auxiliary scale divisions or so called multiplying factors with which the pointer of the measuring instrument comes in alinement prior to the release of the locking means.

Other objects of the invention will be apparent or will be specifically pointed out in the following description with reference to the accompanying drawings which disclose by way of example a few embodiments of the invention. It is desired to point out, however, that the invention is not limited to the embodiments of the invention herein described, as various other forms may be adopted within the scope of the claims.

In the drawings:

Fig. 1 is a vertical cross-sectional view on the line I—I of Fig. 2 and illustrates the operative connection of the shutter tensioning knob and the diaphragm adjusting knob with the adjustable contact member of the variable resistance of the photo-electric exposure meter.

Fig. 2 is a horizontal cross-sectional view on the line II—II of Fig. 1 in a plane just above the top wall of the camera casing.

Fig. 6 illustrates in a reduced scale a camera according to Figs. 1 and 5 of the present invention.

Figs. 9 and 10 illustrate the elements of the Figs. 7 and 8 respectively, diagrammatically for the purpose of explaining the operation of this modification.

Fig. 11 illustrates the locking device limiting the movement of the slidable contact member of the variable resistance.

Fig. 12 is a wiring diagram of the exposure meter and illustrates diagrammatically the coupling of the slidable contact member with the camera adjusting devices.

Fig. 13 is a vertical section through the inspection window of the camera showing also the means for transmitting motion to the covering scale.

Fig. 14 is a vertical section through one part of the motion transmitting means.

Fig. 15 is a vertical section along the slide-way of the control knob 77 which is mounted on the planetary gear support 19$^b$.

Fig. 16 shows the position of the covering scale with its control members, when it is not visible within the inspection window.

Fig. 17 shows the position of the scale, when it becomes visible within the inspection window.

Figure 3:
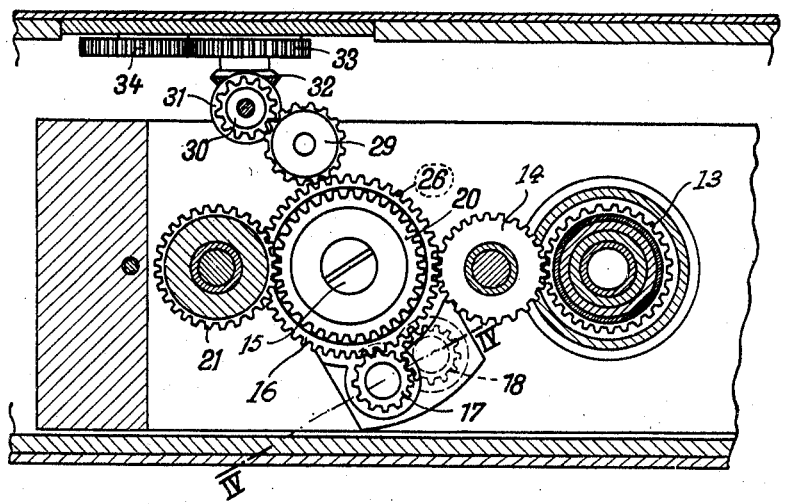
Fig. 3 is a horizontal cross-sectional view on the line III—III of Fig. 1 in a plane just below the top wall of the camera casing.

Referring to the embodiment of the invention illustrated in the Figs. 1 to 5, the camera casing 1 is provided at its narrow top wall 1ᵃ with a shutter tensioning knob 2 and a diaphragm adjusting knob 3. The shutter tensioning knob 2 is adapted to be connected by means of a catch (not shown) with an annular member 4 provided with a shutter speed scale (see Fig. 10), so that the knob 2 is used not only for tensioning the shutter but also for adjusting the speed of the same. A suitable mark on the knob 2 indicates the shutter speed for which the shutter of the camera has been set. The annular member 4 is connected by means of a screw 5 or the like, with an angle-lever 6 which is rotatable about the same axis the knob 2 is rotated.

Figure 4:
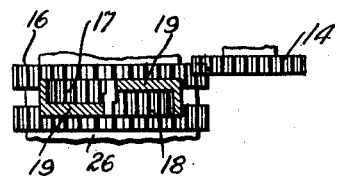
Fig. 4 is a sectional view of the support for the planetary gears on the line IV—IV of Fig. 3.

A curved lever 8 is pivotally supported between its ends by a pivot pin 7 attached to one arm of the angle-lever 6 (Fig. 2). One end of the lever 8 carries a guide pin 9 extending into a curved cam slot 10 in a flange 10' of a stationary bearing member 10''. The other end of the lever 8 carries a pin 12 engaging a fork 11 which extends radially from the hub of a gear 13 (Figs. 1, 2). The cam slot 10 is provided for compensating the differences of the angular adjustments of the knobs 2 and 3 with respect to the light values and specific resistance values respectively. The gear 13 meshes with a gear 14 which in turn meshes with a sun gear 16 rotatable on a shaft 15. The shaft 15 supports rotatably a carrier support 19 on which two planetary gears 17 and 18, which mesh with each other, are rotatably mounted (Figs. 3, 4). The planetary gear 17 meshes also with the sun gear 16 and the other planetary gear 18 meshes with a sun gear 26 arranged rotatable on shaft 15 and in axial alinement with the sun gear 16. A gear 20 on shaft 15 meshes with a gear 21 which is fixedly connected with a dish-like member 22 on which one end of a curved spring 23 (Figs. 1 and 2) is secured. The other end of the spring 23 carries a contact member 24 which slidably engages the fixedly mounted resistance 25 of the exposure meter.

The sun gear 26 is adapted to be driven by a gear 28 on the lower end of a sleeve 28' which is rotatably mounted on a bearing pin 27. The diaphragm adjusting knob 3 is fixedly attached to the upper end of the sleeve 28'. According to the Figs. 1 and 3 the sun gear 26 operates also a train of gears 29, 30, 31, 32, 33, 34. The last named gear 34 meshes with an annular gear 35 which is mounted coaxially with the axis of the photographic objective of the camera.

Figure 5:
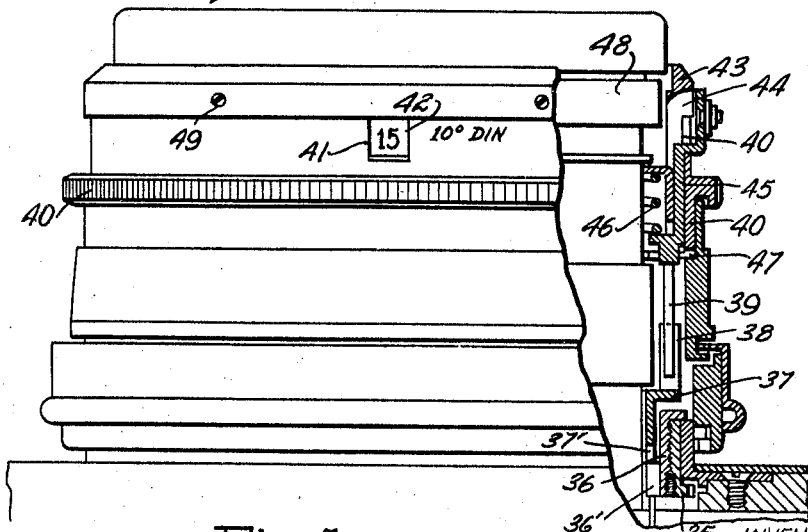
Fig. 5 illustrates in elevation and partly in section the mount for the photographic objective of the camera.

Referring now to Fig. 5 it will be noted that the annular gear 35 is attached to a ring 36 provided on its inner circumference with clutch teeth 36' which are in axially sliding engagement with clutch teeth 37' on one end of a ring 37 arranged on the objective mount. The ring 37 in turn is connected at its other end by means of clutch teeth 38, 39 with an adjusting ring 40 provided with a window 41 through which is visible a scale 42 applied to a ring 43. The ring 43 is provided with a recess 44 in which engages a latch 45. The latch 45 is normally urged by a spring 46 into engagement with teeth 47 on the adjusting ring 40. The ring 43 is rigidly connected by means of screws 49 or the like with the guide ring 48 for the diaphragm blades, so that upon a rotative adjustment of the ring 43 by means of the annular gear 35, the diaphragm aperture of the photographic objective is increased or decreased as the case may be.

In Fig. 12, which illustrates the wiring diagram of the photo-electric exposure meter, 52 designates the photo-electric cell which may be mounted at any suitable place on the camera casing so as to be energized by light reflected from the scene to be photographed. A measuring instrument 53, which likewise is mounted on or in the camera casing, and the variable resistance 25 are connected in parallel to the photo-electric cell 52 as indicated by the conductors 50 and 51. The pointer 54 of the measuring instrument is arranged opposite a scale consisting of a fixed mark 55 and a number of auxiliary marks, which are used when it is impossible to bring the pointer 54 opposite the fixed mark 55 by adjusting the slidable contact member 24 along the resistance 25. The numbers assigned to the auxiliary marks indicate how often the exposure time indicated by the shutter speed scale (Fig. 10) has to be multiplied to give the correct exposure, when the pointer 55 has been brought opposite one of these auxiliary or so cal'ed "multiplier" marks. By way of example the meauring instrument has two auxiliary marks which are provided with the numbers 2 and 5 respectively.

The operation of the above described apparatus is as follows:

First of all it is advisable to adjust the camera for the emulsion speed of the film which has been loaded into the camera. This is accomplished by moving the latch 45 upwardly (Fig. 5) against the tension of the spring 46. This releases the adjusting ring 40 which now may be rotated until the number of the scale corresponding to the emulsion speed, in the present example 15/°10 DIN, appears in the window 42. Now the photographer can select the shutter speed or the diaphragm aperture. If, for instance, a certain diaphragm aperture or "stop" is desired, the diaphragm adjusting knob 3 is rotated until the mark 3ª on the same is brought opposite the desired scale division of a diaphragm scale engraved for instance on the conical flange 1ᵇ directly below the knob (Fig. 1). During this rotation of the knob 3, the planetary gear 18 is driven by the gears 28, 26. Since the gear 16, owing to the self-locking property of the planetary gearing remains stationary, it follows that the planetary gear 17 meshing with the driven planetary gear 18 rolls along the circumference of the gear 16. This has the effect that the carrier support 19, on which the planetary gears 17, 18 are mounted, is rotated and since the gear 20 is fixedly connected to the support 19, the gear 20 is also rotated and in turn rotates the gear 21, the dish-like member 22 and the contact member 24, resulting in a variation of the resistance 25 in the circuit of the exposure meter. At the same time the sun gear 26 drives the gearing 29, 30, 31, 32, 33, 34 and 35 which adjusts the diaphragm guide ring 84 to the position in which the diaphragm aperture has the size indicated by the mark 3ª on the knob 3. This adjustment of the diaphragm adjusting knob 3 usually leaves the pointer 54 of the measuring instrument 53 in a position away from the fixed mark 55. In order to bring the pointer 54 into registration with the mark 55, thus indicating a correct adjustment of the camera, it is necessary to increase or decrease the resistance 25. This is done by rotatably adjusting the annular shutter speed adjusting member 4, which when rotated displaces by means of the angle-lever 6 the curved lever 8, which in turn rotates the fork 11 and the gear 13 connected therewith. As will be obvious, the rotative movement of the member 4 is transformed into a somewhat modified rotative movement of the gear 13 owing to the incorporation of the levers 6 and 8, the movement of the latter of which is controlled by the cam slot 10 in the stationary bearing member 10', 10". The gear 13 in turn drives by means of the gears 14 the sun gear 16 and the planetary gear 17 which drives the planetary gear 18 in opposite direction. The gear 18 rolls now along the stationary gear 26 with the result that the carrier support 19 and with the same the gear 20 is rotated. It will be obvious that the slidable contact member 24 is again rotated by the members 22, 23 relatively to the resistance 25 and this adjustment is continued until the pointer 54 of the measuring instrument is in alinement with the fixed mark 55. In this position of the pointer 54 the shutter has been adjusted to the correct speed with respect to the previously selected "stop" of the camera to give a correct exposure of the negative under the prevailing light conditions.

Figure 7:
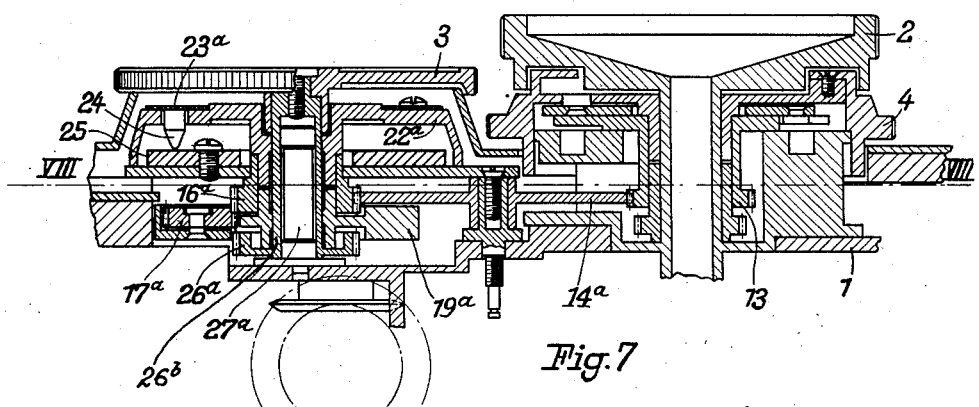
Fig. 7 is a vertical cross-sectional view of another modification on the broken line VII—VII of Fig. 8.
Figure 8:
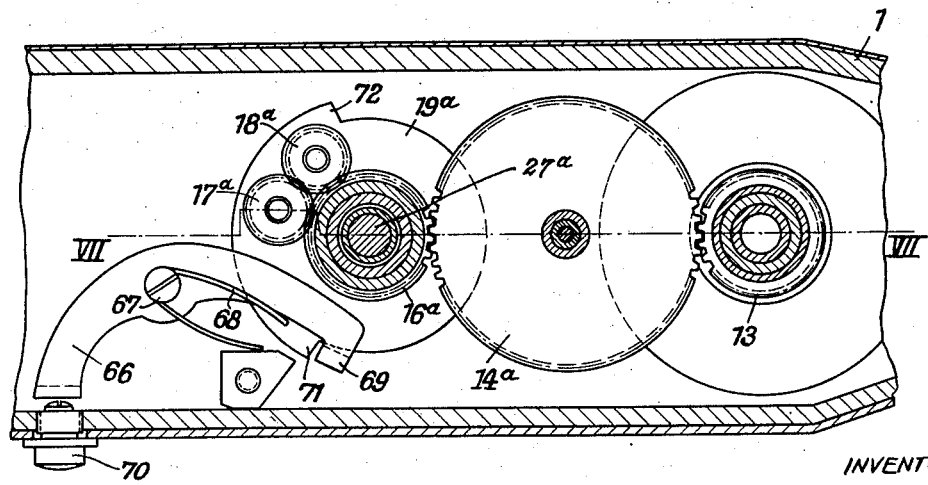
Fig. 8 is a horizontal cross-sectional view on the line VIII—VIII of Fig. 7.

In the modification illustrated in the Figs. 7 and 8, the gear 13 which is operatively connected with the shutter speed adjusting disc 4 meshes with a gear 14ª which in turn meshes with a sun gear 16ª. A planetary gear 17ª engages the sun gear 16ª and also another planetary gear 18ª. Both planetary gears 17ª and 18ª are mounted on a support 19ª rotatable on the hub sleeve 26ᵇ of the sun gear 26ª supported on the shaft 27ª. the sun gear 26ª on shaft 27ª meshes with the planetary gear 18ª. The tubular hub 26ᵇ (Fig. 7) of the sun gear 26ᵇ has on its upper end the knob 3 rigidly secured thereto. The support 19ª is provided with clutch teeth engaging similar clutch teeth on the hub portion of the dish-shaped member 22ª.

The dish-shaped member 22ª, in similar manner as in the Figs. 1 and 2, has attached thereto a curved spring 23ª carrying the contact member 24 which slidably engages the stationary resistance 25. For the sake of a more convenient understanding of the invention, the Figs. 9 and 10 illustrate diagrammatically the same structures as shown in Figs. 7 and 8 respectively. It will be noted from Fig. 9 that the sun gear 26ª is also drivingly connected with a gear train 30ª, 31, 32, 33 and 34 for rotating in the same manner as in Fig. 1 an annular gear 35 which is mounted concentric about the axis of the mount of the photographic objective and is operatively connected with the diaphragm of the same.

According to the present invention the rotatably mounted support 19ª for the two planetary gears 17ª and 18ª is provided with two stops 71 and 72 (Figs. 8, 11 and 12). A locking lever 66 mounted between its ends rotatably on a pivot pin 67 (Fig. 8) is urged by a spring 68 against the support 19ª so that a projection 69 at one end of the lever 66 engages the circumference of the support 19ª.

The stop 71 corresponds to one end position of the contact member 24 and according to Fig. 12 constitutes the lower limit of the measuring range of the resistance 25. If the contact member 24 reaches this lower limit of the resistance 25 a further rotation of the support 19ª is prevented by the lever 66, whose projection 69 engages the stop 71. Should is be impossible to bring the pointer 54 into registration with the mark 55 the reading is taken on the multiplier scale, namely, with that auxiliary multiplier scale division which is or can be brought in registration with the pointer 54. If the shutter has been adjusted, for instance to a speed of 1/50 of a second while the pointer 54 is opposite the multiplier scale division "2," the correct shutter speed would be 2×1/50, namely, 1/25 of a second. In order to permit a setting of the shutter speed adjusting member to 1/25 of a second, it is first necessary to release the locked support 19ª by depressing the push-button 70, mounted in a wall of the camera casing. The push-button 70 moves the lever 66 out of locking engagement with the stop 71 on the support 19ª. Thereupon, the support 19ª may be further rotated until the shutter adjusting means indicates a speed of 1/25 of a second. It is, however, also possible to retain the shutter speed of 1/50 of a second and increase in accordance with the indication on the multiplier scale the size of the diaphragm aperture, which also necessitates a release of the locking lever 66 before the diaphragm can be adjusted.

When the scene brightness is very great it may happen that the contact member 24 reaches the upper limit of the measuring range of the resistance 25. In such a case the stop 72 prevents a further movement of the contact member 24 so that the same cannot reach the terminal contact 73 of the resistance 25, because this would result practically in short circuiting the measuring instrument which then would not deflect the pointer at all.

The Figures 13–17 show a modification of the device according to the invention. This modification comprises an optical signaling device which becomes effective, whenever the semi-automatical exposure control device has been adjusted to the lower measuring limit. The optical signaling device preferably consists of a covering scale carrying auxiliary marks. Whenever the exposure control device has been adjusted to the lower measuring limit the scale becomes visible when looking through the inspection window.

Preferably the optical signaling device is operatively connected with the locking means so that the auxiliary scale becomes visible at the instant the locking lever 66 prevents a further rotation of the support 19ᵃ.

It may readily be seen from the Figs. 13–16 that the planetary gear support 19ᵇ is provided with an annular rim or cam 74 along which a knob 77 is slidably movable, this knob being fixed to a fork-like member 76 which in turn is rotatably mounted on a pin 75. The free end of the fork-like member 76 is provided with a plug 78 which carries a head member 79 of conical shape, this plug being carried by a cylindrical hole of the disc 80.

The operation of the device is as follows:

When the exposure controlling device has been adjusted to its lower measuring limit corresponding to a definite rotation of the planetary gear support 19ᵇ the knob 77 comes in contact with the rim or cam 74 thus lifting the fork-like member 76 and simultaneously pressing the plug 78 with its conical head member 79 against a spring 81. The oblique portion of the conical head member 79 comes slidably in contact with an arm 83 which is pivotally mounted on a pin 82, thereby causing the arm 83 to rotate in a clockwise direction. The arm 83 is operatively connected to another arm 85 which in turn is rotatably mounted in 84 and which carries the multiplying scale. Thus by transmitting motion from the arm 83 to the arm 85 the scale becomes visible within the inspection window as illustrated in Fig. 17.

What we claim as our invention is:

1. In a photographic camera, the combination of a photo-electric exposure meter, a photographic objective provided with a rotatable diaphragm adjusting ring, a variable resistance and a contact member in slidable engagement with the same in the circuit of said exposure meter, a diaphragm adjusting member, a shutter speed adjusting member, means operatively connecting said slidable contact member with said diaphragm adjusting member and said shutter speed adjusting member for moving said slidable contact member whenever either one of said adjusting members is actuated, said operative connecting means including a planetary gearing for preventing the operation of one adjusting member by the other, said planetary gearing having two sun gears rotatable about a common axis, a support rotatable about said common axis and having two planetary gears rotatably mounted thereon, said planetary gears meshing with each other and also each with one of said sun gears respectively, said operative connecting means including also means for drivingly connecting said support with said slidable contact member, means for drivingly connecting one of said sun gears with said diaphragm adjusting member, and means for drivingly connecting the other one of said sun gears with said shutter speed adjusting member, and a gearing connecting said diaphragm adjusting member with said diaphragm adjusting ring.

2. In a photographic camera, the combination of a photo-electric exposure meter, a photographic objective provided with a rotatable diaphragm adjusting ring, a variable resistance and a contact member in slidable engagement with the same in the circuit of said exposure meter, a diaphragm adjusting member, a shutter speed adjusting member, means operatively connecting said slidable contact member with said diaphragm adjusting member and said shutter speed adjusting member for moving said slidable contact member whenever either one of said adjusting members is actuated, said operative connecting means including a planetary gearing for preventing the operation of one adjusting member by the other, said planetary gearing having two sun gears rotatable about a common axis, a support rotatable about said common axis and having two planetary gears rotatably mounted thereon, said planetary gears meshing with each other and also each with one of said sun gears respectively, said operative connecting means including also means for drivingly connecting said support with said slidable contact member, means for drivingly connecting one of said sun gears with said diaphragm adjusting member, and means for drivingly connecting the other one of said sun gears with said shutter speed adjusting member, and a gearing connecting the sun gear which is drivingly connected with said diaphragm adjusting member with said diaphragm adjusting ring.

3. In a photographic camera, the combination of a photo-electric exposure meter, a variable resistance and a single contact member in slidable engagement therewith in the circuit of said exposure meter, said camera being provided with a rotatable member for adjusting the diaphragm aperture of the photographic objective and with a rotatable shutter speed adjusting member, and means for operatively connecting said slidable contact member with said diaphragm adjusting member and said shutter speed adjusting member for moving said contact member whenever either one of said adjusting members is actuated, said operative connecting means including a planetary gearing for preventing the operation of one adjusting member by the other, said planetary gearing having two sun gears rotatable above a common axis, a support rotatable about said common axis and having two planetary gears rotatably mounted thereon, said planetary gears meshing with each other and also each with one of said sun gears respectively, said operative connecting means including also means for drivingly connecting said support with said slidable contact member, means for drivingly connecting one of said sun gears with said diaphragm adjusting member, and means for drivingly connecting the other one of said sun gears with said shutter speed adjusting member.

4. In a photographic camera, the combination of a photo-electric exposure meter, a camera casing, a photographic objective provided with a rotatable diaphragm adjusting ring, a variable resistance and a contact member in slidable engagement with the same in the circuit of said exposure meter, said resistance being fixedly mounted in said camera casing, a diaphragm adjusting member and a shutter speed adjusting member mounted on said camera casing, means including a differential gearing for operatively connecting said slidable contact member with said diaphragm adjusting member and with said shutter speed adjusting member for moving said contact member whenever either one of said adjusting members is actuated, said differential gearing preventing the operation of one adjusting member by the other, and comprising two sun gears rotatable about a common axis, a support rotatable about said common axis and having two planetary gears rotatably mounted thereon, said planetary gears meshing with each other and also each with one of said sun gears respectively, said means including also an operative connection between said rotatable support and said slidable contact member and an operative connection between each of said sun gears and said diaphragm adjusting member and said shutter speed adjusting member respectively; and means operatively connecting said diaphragm adjusting member with said diaphragm adjusting ring.

5. In a photographic camera, the combination of a photo-electric exposure meter, a camera casing, a photographic objective provided with a rotatable diaphragm adjusting ring, a variable resistance and a contact member in slidable engagement with the same in the circuit of said exposure meter, said resistance being fixedly mounted in said camera casing, a diaphragm adjusting member and a shutter speed adjusting member mounted on said camera casing, means including a differential gearing for operatively connecting said slidable contact member with said diaphragm adjusting member and with said shutter speed adjusting member for moving said contact member whenever either one of said adjusting members is actuated, said differential gearing preventing the operation of one adjusting member by the other, and comprising two sun gears rotatable about a common axis, a support rotatable about said common axis and having two planetary gears rotatably mounted thereon, said planetary gears meshing with each other and also each with one of said sun gears respectively, said means including also an operative connection between said rotatable support and said slidable contact member, and an operative connection between each of said sun gears and said diaphragm adjusting member and said shutter speed adjusting member respectively; and a gearing connecting the sun gear which is drivingly connected with said diaphragm adjusting member with said diaphragm adjusting ring.

6. In a photographic camera, the combination of a photo-electric exposure meter, a camera casing provided with a narrow top wall, a photographic objective mount having a rotatable diaphragm adjusting ring, a variable resistance and a contact member in slidable engagement therewith in the circuit of said exposure meter, said resistance being fixedly mounted in said camera casing, a rotatable diaphragm adjusting member and a rotatable shutter speed adjusting member mounted on the top wall of said camera casing, means including a differential gearing for operatively connecting said slidable contact member with said diaphragm adjusting member and with said shutter speed adjusting member for moving said contact member whenever either one of said adjusting members in actuated, said differential gearing preventing the operation of one adjusting member by the other, and comprising two sun gears rotatable about a common axis, a support rotatable about said common axis and having two planetary gears rotatably mounted thereon, said planetary gears meshing with each other and also each with one of said sun gears respectively, said means including also an operative connection between said rotatable support and said slidable contact member, and an operative connection between each of said sun gears and said diaphragm adjusting member and said shutter speed adjusting member respectively, and means operatively connecting said diaphragm adjusting member with said diaphragm adjusting ring.

7. In a photographic camera, the combination of a photo-electric exposure meter, a camera casing, a photographic objective provided with a rotatable diaphragm adjusting ring, a variable resistance and a contact member in slidable engagement with the same in the circuit of said exposure meter, said resistance being fixedly mounted in said camera casing, a diaphragm adjusting member and a shutter speed adjusting member mounted on said camera casing, means including a differential gearing for operatively connecting said slidable contact member with said diaphragm adjusting member and with said shutter speed adjusting member for moving said contact member whenever either one of said adjusting members is actuated, said differential gearing preventing the operation of one adjusting member by the other, and comprising two sun gears rotatable about a common axis, a support rotatable about said common axis and having two planetary gears rotatably mounted thereon, said planetary gears meshing with each other and also each with one of said sun gears respectively, said means including also an operative connection between said rotatable support and said slidable contact member, and an operative connection between each of said sun gears and said diaphragm adjusting member and said shutter speed adjusting member respectively; and a gearing connecting the sun gear which is drivingly connected with said diaphragm adjusting member with said diaphragm adjusting ring, said last named gearing including a releasable coupling for adjusting one member of said gearing relatively to said diaphragm adjusting ring to adjust the camera for different film speeds, and means cooperating with said diaphragm adjusting ring for indicating the film speed for which the camera has been adjusted.

8. In a photographic camera, the combination of a photo-electric exposure meter, a camera casing, a photographic objective provided with a rotatable diaphragm adjusting ring, a variable resistance and a contact member in slidable engagement with the same in the circuit of said exposure meter, said resistance being fixedly mounted in said camera casing, a rotatable diaphragm adjusting member and a rotatable shutter speed adjusting member mounted on said camera casing, means including a differential gearing for operatively connecting said slidable contact member with said diaphragm adjusting member and with said shutter speed adjusting member for moving said contact member whenever either one of said adjusting members is actuated, said differential gearing preventing the operation of one adjusting member by the other, and comprising two sun gears rotatable about the axis of rotation of said diaphragm adjusting member, a support rotatable about the same axis and having two planetary gears rotatably mounted thereon, said planetary gears meshing with each other and also each with one of said sun gears respectively, said means including also an operative connection between said rotatable support and said slidable contact member, and an operative connection between each of said sun gears and said diaphragm adjusting member and said shutter speed adjusting member respectively; and means operatively connecting said diaphragm adjusting member with said diaphragm adjusting ring.

9. In a photographic camera, the combination of a photo-electric exposure meter, a photographic objective provided with a rotatable diaphragm adjusting ring, a variable resistance and a contact member in slidable engagement with the same in the circuit of said exposure meter, a rotatable diaphragm adjusting member, a rotatable shutter speed adjusting member, means operatively connecting said slidable contact member with said diaphragm adjusting member and said shutter speed adjusting member for moving said slidable contact member whenever either one of said adjusting members is actuated, said operative connecting means including a planetary gearing for preventing the operation of one adjusting member by the other, said planetary gearing having two sun gears rotatable about a common axis, a support rotatable about said common axis and having two planetary gears rotatably mounted thereon, said planetary gears meshing with each other and also each with one of said sun gears respectively, said operative connecting means including also means for drivingly connecting said support with said slidable contact member, means for drivingly connecting one of said sun gears with said diaphragm adjusting member and means for drivingly connecting the other one of said sun gears with said shutter speed adjusting member, said last named driving connection including a gear rotatable about the axis of said shutter speed adjusting member, a radially extending fork on said gear engaging one end of a lever whose other end engages a curved cam slot in a stationary member, said lever being pivotally supported between its ends by an arm attached to said shutter speed adjusting member; and a gearing connecting said diaphragm adjusting member with said diaphragm adjusting ring.

10. In a photographic camera, the combination of a photo-electric exposure meter, a camera casing, a photographic objective mount provided with a rotatable diaphragm adjusting ring, a variable resistance and a single contact member in slidable engagement therewith in the circuit of said exposure meter, a diaphragm adjusting member and a shutter speed adjusting member mounted on said camera casing, means including a differential gearing for operatively connecting said single contact member with both said adjusting members for moving said contact member whenever either one of said adjusting members is actuated, said differential gearing preventing the operation of one of said adjusting members by the other and comprising two sun gears rotatable about a common axis, a support rotatable about said common axis and having mounted thereon two planetary gears, one for each of said sun gears and meshing with the same, said planetary gears also meshing with each other, means for drivingly connecting said support with said slidable contact member, means for drivingly connecting one of said sun gears with said diaphragm adjusting member and the other of said sun gears with said shutter adjusting member, a gearing connecting the sun gear connected with said diaphragm adjusting member with said diaphragm adjusting ring on said objective mount, and means for limiting the rotation of said support when said slidable contact member has reached one end of said resistance and the latter is completely inserted in the circuit of the exposure meter, said last named means including a stop on said rotatable support and a manually releasable latch lever which normally engages said support and prevents a further rotation of the same in one direction when engaging said stop.

11. In a photographic camera, the combination of a photo-electric exposure meter, a camera casing, a photographic objective mount provided with a rotatable diaphragm adjusting ring, a variable resistance and a single contact member in slidable engagement therewith in the circuit of said exposure meter, a diaphragm adjusting member and a shutter speed adjusting member mounted on said camera casing, means including a differential gearing for operatively connecting said single contact member with both said adjusting members for moving said contact member whenever either one of said adjusting members is actuated, said differential gearing preventing the operation of one of said adjusting members by the other and comprising two sun gears rotatable about a common axis, a support rotatable about said common axis and having mounted thereon two planetary gears, one for each of said sun gears and meshing with the same, said planetary gears also meshing with each other, means for drivingly connecting said support with said slidable contact member, means for drivingly connecting one of said sun gears with said diaphragm adjusting member and the other of said sun gears with said shutter speed adjusting member, a gearing connecting the sun gear connected with said diaphragm adjusting member with said diaphragm adjusting ring on said objective mount, and means for limiting the rotation of said support when said slidable contact member has reached either end of its measuring range on the variable resistance, said last means including two spaced stops on said rotatable support and a manually operable latch lever normally extending into the path of movement of said stops and adapted to be moved out of the path of said stops.

12. In a photographic camera, the combination of a photo-electric exposure meter, a camera casing, a photographic objective mount provided with a rotatable diaphragm adjusting ring, a measuring instrument and a variable resistance engaged by a slidable contact member in the circuit of said exposure meter, said measuring instrument being provided with a fixed scale and a movable pointer, a diaphragm adjusting member and a shutter speed adjusting member mounted on said camera casing, means including a differential gearing for operatively connecting said single contact member with both said adjusting members for moving said contact member whenever either one of said adjusting members is actuated, said differential gearing preventing the operation of one of said adjusting members by the other and comprising two sun gears rotatable about a common axis, a support rotatable about said common axis and having mounted thereon two planetary gears, one for each of said sun gears and meshing with the same, said planetary gears also meshing with each other, means for drivingly connecting said support with said slidable contact member, means for drivingly connecting one of said sun gears with said diaphragm adjusting member and the other of said sun gears with said shutter adjusting member, a gearing connecting the sun gear connected with said diaphragm adjusting member with said diaphragm adjusting ring on said objective mount, means for limiting the rotation of said support when said slidable contact member has reached one end of said resistance and the latter is completely inserted in the circuit of the exposure meter, said last named means including a stop on said rotatable support and a manually releasable latch lever which normally engages said support and prevents a further rotation of the same in one direction when engaging said stop, and means including a movably mounted member provided with an auxiliary scale actuated by said support when the resistance is completely inserted in said circuit for moving said auxiliary scale over said fixed scale.

13. In a photographic camera, the combination of a photo-electric exposure meter, a camera casing, a photographic objective mount provided with a rotatable diaphragm adjusting ring, a measuring instrument and a variable resistance engaged by a slidable contact member in the circuit of said exposure meter, said measuring instrument being provided with a fixed scale and a movable pointer, a diaphragm adjusting member and a shutter speed adjusting member mounted on said camera casing, means including a differential gearing for operatively connecting said single contact member with both said adjusting members for moving said contact member whenever either one of said adjusting members is actuated, said differential gearing preventing the operation of one of said adjusting members by the other and comprising two sun gears rotatable about a common axis, a support rotatable about said common axis and having mounted thereon two planetary gears, one for each of said sun gears and meshing with the same, said planetary gears also meshing with each other, means for drivingly connecting said support with said slidable contact member, means for drivingly connecting one of said sun gears with said diaphragm adjusting member and the other of said sun gears with said shutter adjusting member, a gearing connecting the sun gear connected with said diaphragm adjusting member with said diaphragm adjusting ring on said objective mount, means for limiting the rotation of said support when said slidable contact member has reached one end of said resistance and the latter is completely inserted in the circuit of the exposure meter, said last named means including a stop on said rotatable support and a manually releasable latch lever which normally engages said support and prevents a further rotation of the same in one direction when engaging said stop, a pivotally mounted member provided with an auxiliary scale having scale division denoting multipliers, a cam on said support, and means engaging said cam and operatively connected with said pivotally mounted member, said last named means being actuated by said cam when said support is rotated into a position in which said resistance is completely inserted in said circuit for moving said auxiliary scale over said fixed scale.

HEINZ KÜPPENBENDER.
OSKAR FISCHER.
GERHARD HENKEL.
OTTOMAR PETERS.
ARTHUR MENDE.